US007175170B2

(12) United States Patent
Kincaid

(10) Patent No.: US 7,175,170 B2
(45) Date of Patent: Feb. 13, 2007

(54) ENGINE MOUNTING STAND

(76) Inventor: Michael C. Kincaid, 6109 Brighton Dr., Evansville, Vanderburgh County, IN (US) 47715

( * ) Notice: Subject to any disclaimer, the term of this patent is extended or adjusted under 35 U.S.C. 154(b) by 0 days.

(21) Appl. No.: 11/148,110

(22) Filed: Jun. 8, 2005

(65) Prior Publication Data

US 2005/0274867 A1 Dec. 15, 2005

Related U.S. Application Data

(60) Provisional application No. 60/578,386, filed on Jun. 10, 2004.

(51) Int. Cl.
*B23Q 1/00* (2006.01)

(52) U.S. Cl. .......................................... 269/50; 269/17

(58) Field of Classification Search ................. 269/50, 269/17, 47, 8 B, 4 B, 7 B, 9 B, 10 B, 2 B; 254/8 B, 4 B, 7 B, 9 B, 10 B, 2 B
See application file for complete search history.

(56) References Cited

U.S. PATENT DOCUMENTS 3,218,056 A * 11/1965 Kaplan et al. ................ 269/61
6,431,535 B1 * 8/2002 Volpe .......................... 269/47
6,491,293 B1 * 12/2002 Brewer ........................ 269/17
6,581,920 B1 * 6/2003 Smith et al. .................. 269/17
2005/0274867 A1 * 12/2005 Kincaid ...................... 248/664

* cited by examiner

*Primary Examiner*—Lee D. Wilson
(74) *Attorney, Agent, or Firm*—Gary K. Price, Esq.

(57) ABSTRACT

An engine mounting stand for small engines, and particularly adapted for motorcycle engines. The engine mounting stand includes an upright and a journal bearing, the upright is attached to a base, a rotating bracket assembly is attached to the journal bearing of the upright, the bracket assembly designed to attach to the engine mount holes of the engine, and is operative for rotatably positioning the engine so that the mechanic can access all areas of the engine. The engine mounting stand can further include an outrigger support attached to the rotating bracket assembly, and an outrigger secured to the outrigger support. The outrigger attaches to the engine and outrigger end aperture can provide further attachment support to the bracket assembly.

12 Claims, 4 Drawing Sheets

ENGINE MOUNTING STAND

CROSS REFERENCES TO RELATED APPLICATIONS

U.S. Provisional Application for Patent No. 60/578,386, filed Jun. 10, 2004, with title "Engine Mounting Stand" which is hereby incorporated by reference. Applicant claims priority pursuant to 35 U.S.C. Par. 119(e)(i).

Statement as to rights to inventions made under federally sponsored research and development: Not Applicable

BACKGROUND OF THE INVENTION

1. Field of the Invention

The present invention relates generally to engine stands, and more particularly to an engine mounting stand such as, but not restricted to a motorcycle engine mounting stand.

2. Brief Description of Prior Art

One problem in repair or modifying engines is gaining access to various components of the engine. Typically, people working on small engines such as a motorcycle engine simply leaves the engine mounted in the motorcycle frame. This method forces the mechanic to work in an uncomfortable position, and inhibits access to many parts of the engine.

To overcome these difficulties, the small engine may have to be removed from the frame. In this case, the engine is then generally simply laid on a workspace, such as a work bench where it is subject to undesirable movement when sufficient force is applied. The engine may be bolted into a stationary mounting frame known in the art however, access to many parts of the engine remain inhibited.

As will be seen from the subsequent description of the preferred embodiments of the present invention, the present invention overcomes these and other shortcomings of the prior art.

SUMMARY OF THE INVENTION

The present invention is an engine mounting stand for small engines, and is particularly adapted for motorcycle engines. The stand includes an upright with a journal bearing, an adjustable bracket fixture, an outrigger support and outrigger. The present invention provides a means for the mechanic to comfortably work on the engine and access all areas of the engine.

These and other objects and advantages of the present invention will become apparent to those skilled in the art in view of the description of the best presently known mode of carrying out the invention as described herein and as illustrated in the drawings.

DESCRIPTION OF THE PREFERRED EMBODIMENT

In accordance with the present invention, an engine mounting stand is disclosed. The present invention relates to an engine mounting stand for small engines, and particularly adapted for motorcycle engines. The present invention allows the mechanic access to all areas of the engine. In the broadest context, the present invention consists of components configured and correlated with respect to each other so as to attain the desired objective.

FIGS. 1–4 illustrate the preferred embodiment of an engine mounting stand 10 made in accordance with the present invention. The engine mounting stand 10 includes a vertical upright 30 having a journal bearing 35 mounted in a tubular sleeve 32 integral to the upright 30 so that, as will be further discussed, rotation of journal bearing 35 is smooth and properly supported.

Figure 1:
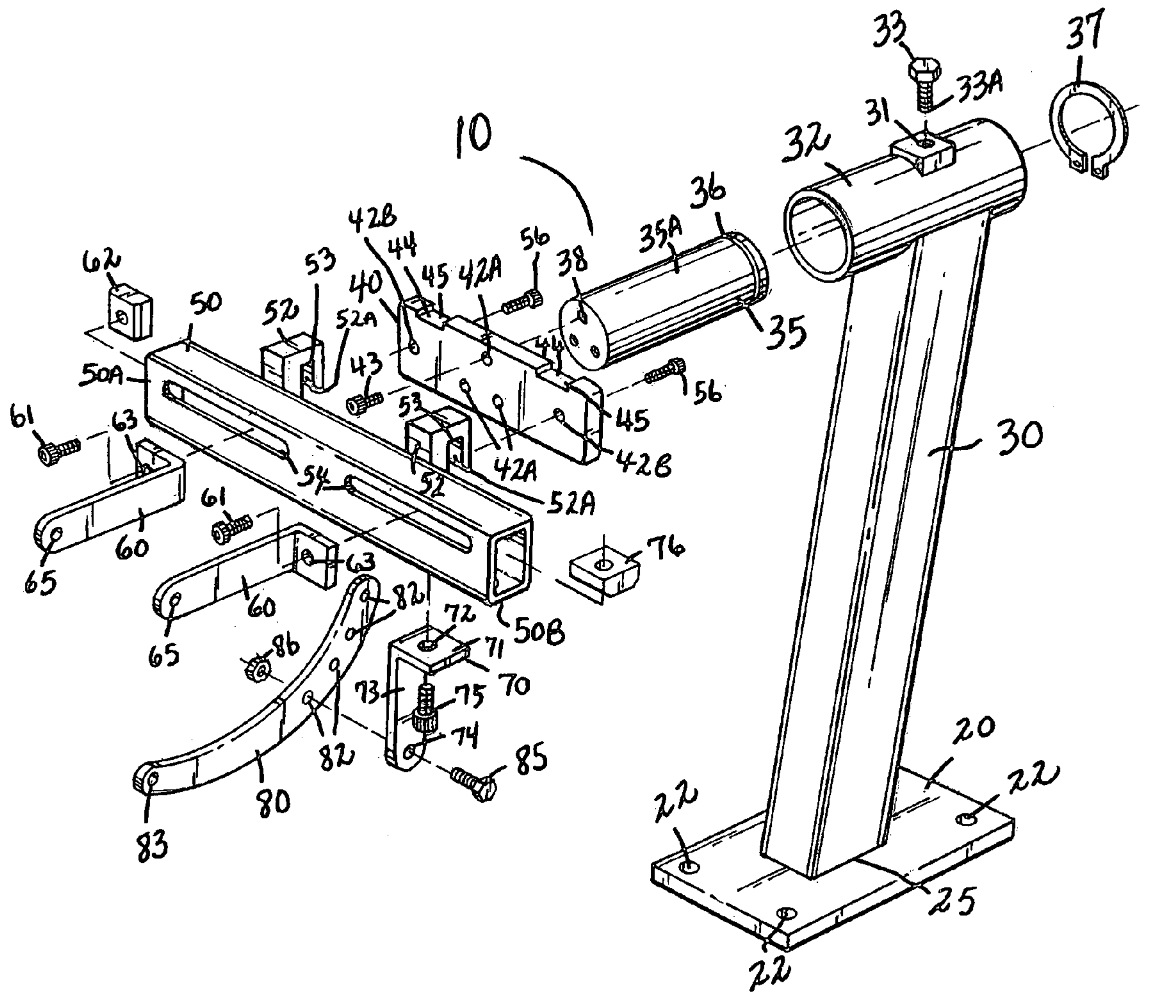
FIG. 1 is an exploded view of the preferred embodiment of the present invention, an engine mounting stand.

As best shown in FIG. 1, the journal bearing 35 includes a slot 36 sized to receive a lock ring 37 for removably maintaining the journal bearing 35 within the tubular sleeve 32.

The tubular sleeve 32 includes a threaded aperture 31 for receipt of a screw 33. In application, the journal bearing 35 can be fixed in placed without further rotation by manually tightening the screw 33 within the aperture 31 until an end 33A of the screw 33 is in frictional contact with a surface 35A of the journal bearing 35.

The engine mounting stand 10 further includes a base 20 secured to the vertical upright 30. The base 20 includes a plurality of holes 22 to secure the stand 10 to a surface with bolts (not shown). The base 20 is secured to the vertical upright 30 by means known in the art such as a weld 25 between the lower end of the vertical upright 30 and the base 20.

A rotating bracket fixture 40 having a plurality of central openings 42A is in alignment with threaded openings 38 in the journal bearing 35. The bracket fixture 40 is attached to the journal bearing 35 by aligning the openings 42A, 38 and threadably securing with screws 43. The bracket fixture 40 is attached to the journal bearing 35 as described such that the bracket fixture 40 is substantially perpendicular to the length of the journal bearing 35.

A slide member 50 is releasably attached to the bracket fixture 40. In particular, the slide member 50 includes arms 52 (best shown in FIG. 1) that define openings 52A. The arms 52 are secured to member 50 by means known in the art preferably a weld.

The openings 52A of the arms 52 receive upper notch-portions 45 of the bracket fixture 40 such that a surface 44 of the notch-portions 45 is in communication with a surface 53 within the openings 52A. The slide member 50 is secured to the bracket fixture 40 with screws 56 so that the screws extend through clearance end openings 42B of the bracket fixture 40 and are received in threaded engagement in threaded opening 55 (best shown in FIG. 2) in the arms 52.

The slide member 50 includes a front surface 50A and a bottom surface 50B. As illustrated, the slide member 50 is formed with a pair of elongated, longitudinally extending slots 54 in the front surface 50A thereof. The slide member 50 further includes a plurality of apertures (not shown) in the bottom surface 50B for securing mounting assemblies as will be discussed.

A pair of L-shaped brackets 60 are each secured to their respective extending slot 54 in the slide member 50 with bolt 61 and nut 62 so that the bolt 61 extends through an aperture 63 in the bracket 60, through the extending slot 54 and secured in threaded engagement with the nut 62 on the back sides of the respective extending slot 54.

The brackets 60 further include end apertures 65 opposite the aperture 63. In application, the end aperture 65 disposed on each of the pair of brackets 60 attach to the engine by means of a threaded bolt (not shown) thereby attaching the engine mounting stand 10 to the engine.

It should be understood the brackets 60 are adjustably secured to their respective elongated, extending slots 54 so that the brackets 60 are longitudinally repositionable along the length of the extending slots 54. In this regard, the brackets 60 can be adjustably positioned for securing the engine mounting stand 10 to various different engines. Further, as the slide member 50 is secured indirectly to the journal bearing 35 that is rotatable in the tubular sleeve 32, the slide member 50 (and brackets 60) can be rotatably positioned as well. As such, the engine secured to the brackets 60 can be rotated to allow the mechanic access to selected areas of the engine.

Figure 2:
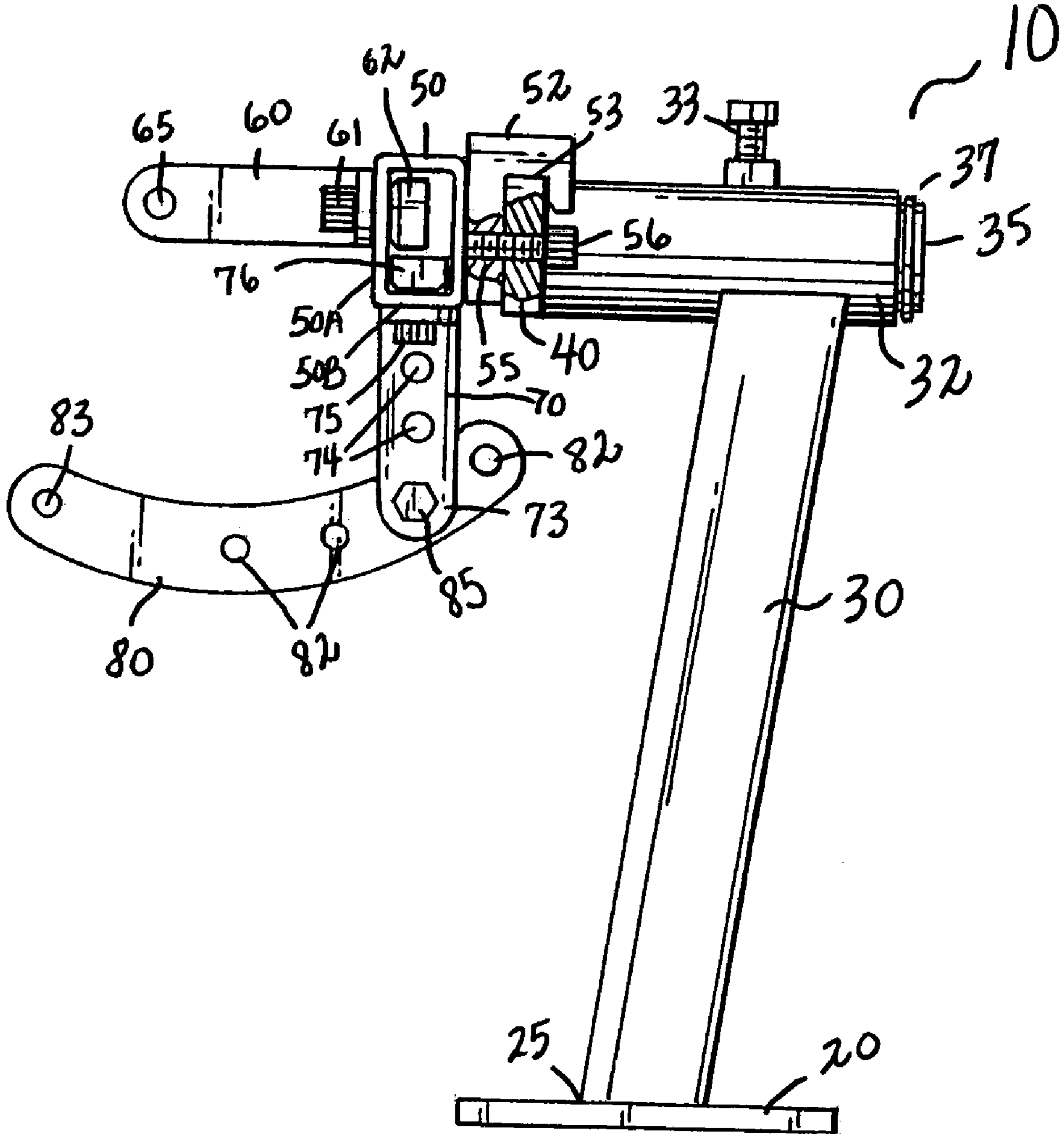
FIG. 2 is a side view of the present invention with a partial sectional side view of the rotating bracket fixture and arms of the slide member.
Figure 3:
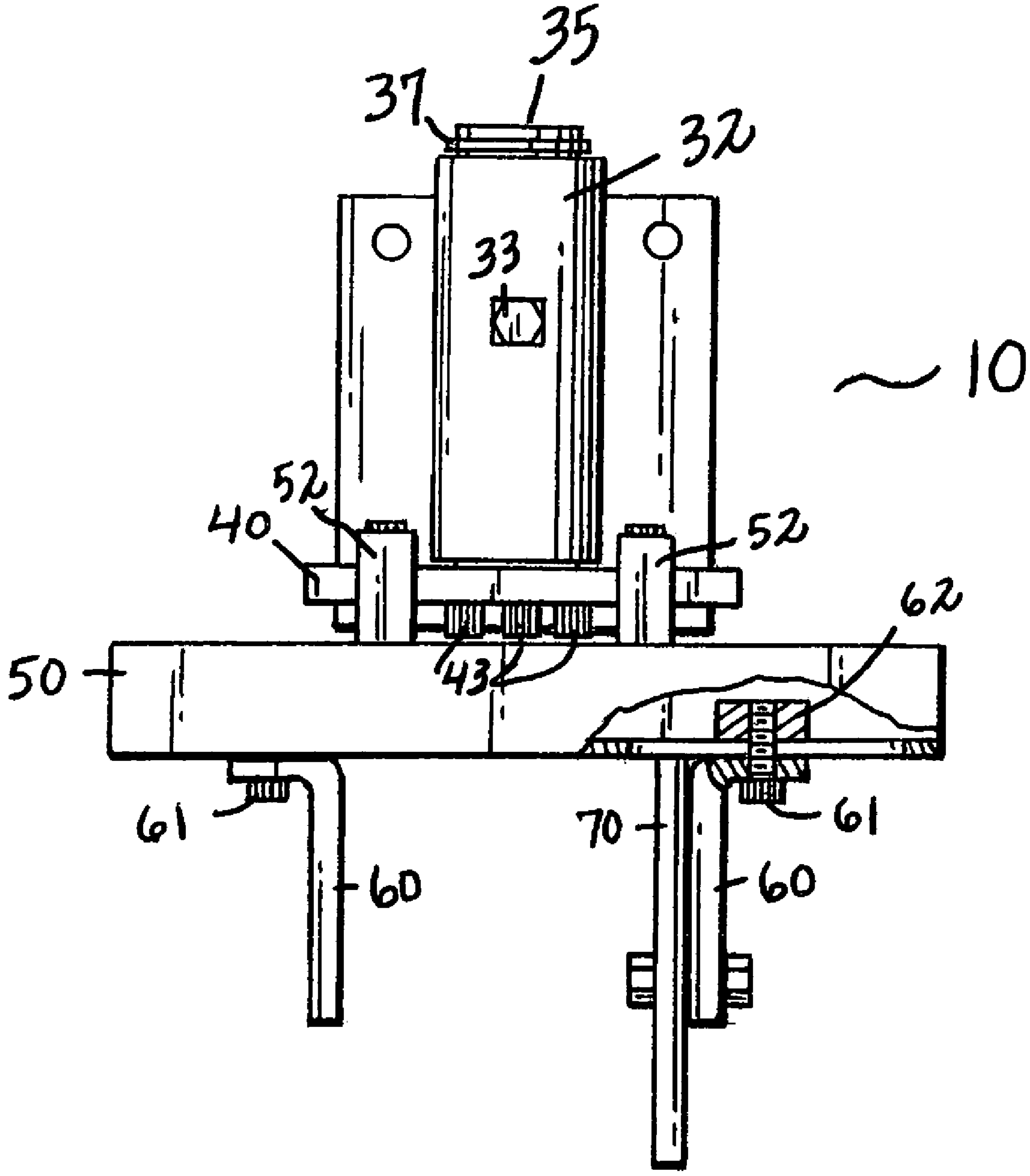
FIG. 3 shows a top view of the engine mounting stand of FIG. 2 with a partial sectional top view of the slide member.
Figure 4:
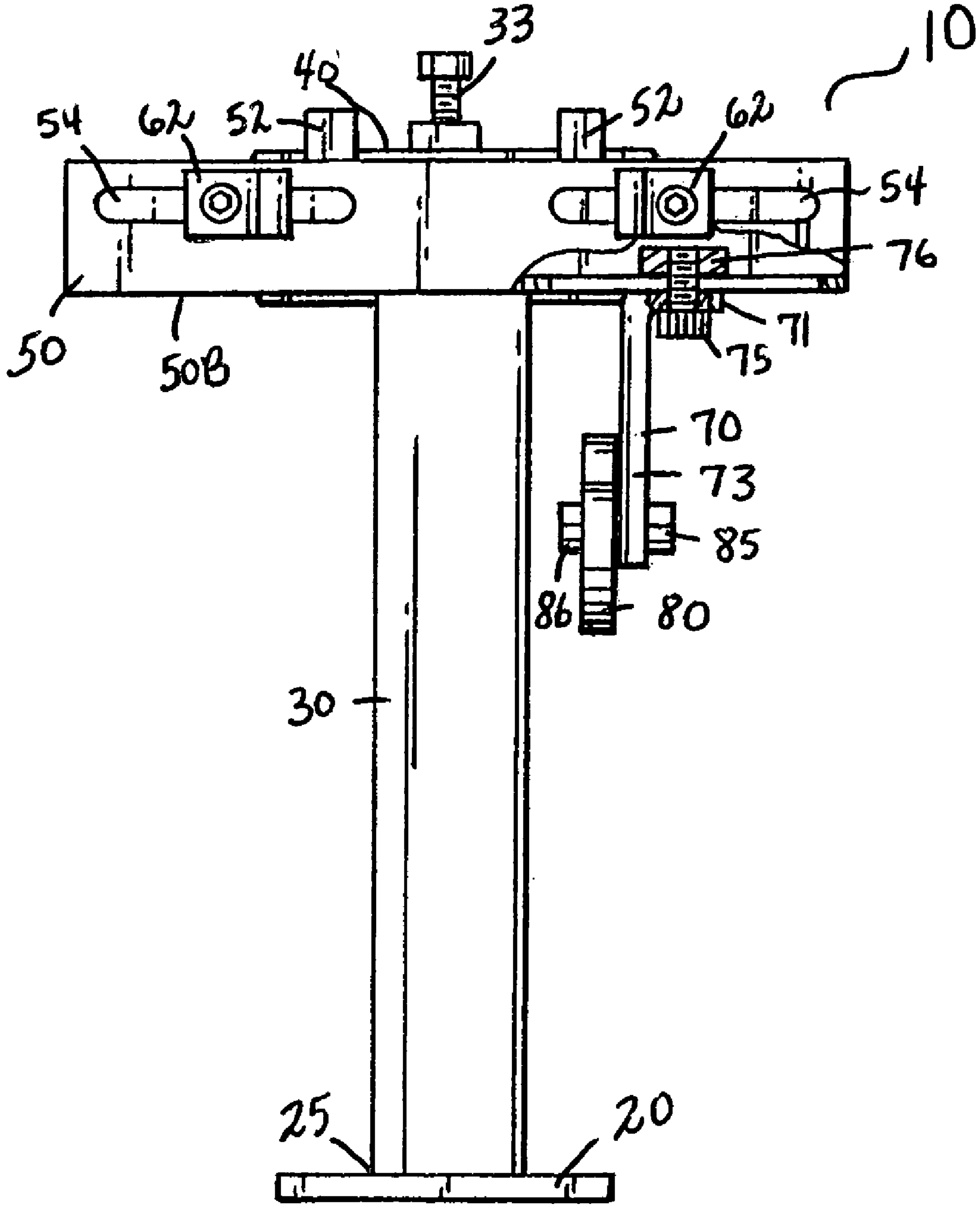
FIG. 4 shows a front view of the engine mounting stand of FIG. 2 with a partial sectional front view of the slide member.

An outrigger support 70 preferably having an L-shape configuration can be attached to one of the plurality of apertures (not shown) in the bottom surface 50B of the slide member 50. In particular, the outrigger support 70 includes a first end 71 having an aperture 72 such that a threaded bolt 75 extends through the aperture 72 and through one of the apertures in the bottom surface 50B and secures the outrigger support 70 to the slide member 50 in the threaded engagement with a nut 76 as best shown in FIG. 2. The outrigger support 70 further includes a second end 73. The first end 71 and second end 73 defining the L-shape configuration of the outrigger support 70.

As best illustrated in FIG. 2, the second end 73 of the outrigger support 70 is substantially perpendicular to the slide member 50 and includes a plurality of apertures 74. An outrigger 80 including a plurality of apertures 82 is selectively secured to the outrigger support 70 with bolt 85 and nut 86 so that the bolt 85 extends through one of the selected apertures 82 of the outrigger 80, through one of the selected apertures 74 of the outrigger support 70, and secured in threaded engagement with the nut 86.

The outrigger 80 further includes an end aperture 83. In application, the end aperture 83 is attached to the engine by means of a threaded bolt (not shown) thereby attaching the engine mounting stand 10 to the engine and further providing attachment support to the L-shaped brackets 60 as discussed above.

As illustrated, the outrigger 80 preferably having a generally concavo-convex shape. In this regard, it should be understood that application of the outrigger 80 is designed to adjustably bolt to various different engines. As such, the outrigger 80 can be repositioned vertically by selectively attaching the outrigger 80 to one of the apertures 74 of the outrigger support 70, and horizontally by selectively attaching one of the plurality of apertures 82 of the outrigger 80 to the outrigger support 70, so that the end aperture 83 is positioned to bolt to the engine as previously discussed.

For use in operation of the engine mounting stand 10, the pair of L-shaped brackets 60 and outrigger 80 are adjustable to adapt the stand 10 to be mounted on various different specific types of engines. In this regard, the end aperture 65 of each of the pair of L-shaped brackets 60, as well as the end aperture 83 of the outrigger 80 are adjustably positioned as discussed above so that threaded bolts are received through the end apertures 65, 83 and are received in threaded engagement in the standard engine mount holes of the engine. Once the engine has been mounted on the stand 10, the stand 10 is operative for rotatably positioning the engine in a stable condition so that the engine can be effectively accessed by the mechanic.

It is seen therefore, that the instant invention provides a highly effective engine stand. The slide member 50 indirectly attached to the rotatable journal bearing 35 and L-shaped brackets 60 are universally adjustable to adapt the stand 10 for receiving a wide variety of engines of different configurations and sizes thereon. Further, once an engine has been mounted on the stand 10, it can be effectively supported and rotatably positioned in a highly stable condition so that the mechanic can access all areas of the engine.

Accordingly, for these reasons, as well as the other reasons hereinabove set forth, it is seen that the engine stand of the present invention represents a significant advancement in the art which has substantial commercial merit. Although the description above contains many specificities, these should not be construed as limiting the scope of the invention but as merely providing illustrations of some of the presently preferred embodiments of this invention.

For example, the base 20 is a convenience for mounting the vertical upright 30 to a surface. The upright 30 can be attached directly to a work surface such as a workbench thereby using the workbench as the base.

Also, the preferred material of construction is steel. As obvious to anyone skilled in the art, other materials such as, but not restricted to, aluminum might be usable.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. An engine mounting stand for rotatably positioning a small engine, said engine mounting stand comprising:

a vertical upright that includes a tubular sleeve, a rotatable journal bearing releasably secured in said tubular sleeve, a mounting assembly releasably attached to said rotatable journal bearing, said mounting assembly having a pair of mounting brackets adapted to receive a small engine, said pair of mounting brackets each include securing means to affix the engine to said mounting brackets and adjustment means to adjust a distance between said mounting brackets, wherein said mounting assembly further includes a slide member having a pair of elongated, longitudinally extending slots, and said mounting brackets are adjustably secured in said extending slot such that said brackets are longitudinally repositionable along the length of said slots, an adjustable outrigger support releasably attached to said slide member, and an adjustable outrigger releasably attached to said outrigger support, wherein said adjustable outrigger having a generally concavo-convex shape, said engine mounting stand is adapted to secure the engine to facilitate maintenance and repair, and said stand is further adapted to rotate the engine to allow a mechanic access to selected areas of the engine.

2. The engine mounting stand as recited in claim 1, wherein said vertical upright is mounted to a base.

3. The engine mounting stand as recited in claim 1, wherein said adjustable outrigger includes an end aperture that attaches to the engine by means of a threaded bolt.

4. An engine mounting stand for rotatably positioning a small engine, said engine mounting stand comprising:

a vertical upright having a tubular sleeve at one end of the upright, and a base secured to an opposite end of the upright, a rotatable journal bearing releasably secured in said tubular sleeve, a rotating bracket fixture releasably secured to said journal bearing such that the rotating bracket fixture is substantially perpendicular to the length of the journal bearing, a slide member attached to the bracket fixture, said slide member including first and second elongated, longitudinally extending slots in a front surface of the slide member, wherein said slide member further includes a bottom surface, said bottom surface having a plurality of bottom surface apertures, wherein an adjustable outrigger support is releasably attached to one of said plurality of bottom surface apertures, and an adjustable outrigger is releasably attached to said outrigger support, wherein said adjustable outrigger having a generally concavo-convex shape.

a first bracket having a first end secured to said first extending slot and a second end opposite the first end having a first end aperture, a second bracket having a first end secured to said second extending slot and a second end opposite the first end having a second end aperture, wherein said first and second end apertures are adapted for coupling to an engine whereby the engine coupled to said first and second brackets rotate when said journal bearing is rotated, and means for fixedly positioning said journal bearing in said tubular sleeve.

5. The engine mounting stand as recited in claim 4, wherein the adjustable outrigger includes an end aperture that attaches to the engine by means of a threaded bolt.

6. An engine mounting stand comprising:

a vertical upright comprising a rotatable bearing, a mounting assembly releasably secured to said rotatable bearing, said mounting assembly including a pair of brackets adapted for coupling to a small engine, wherein said mounting assembly includes adjustment means such that said brackets are adjustable, wherein said adjustable means includes a slide member having a pair of elongated, longitudinally extending slots, wherein said brackets are secured to said extending slots such that said brackets are longitudinally repositionable along the length of said slots, wherein an adjustable outrigger support is releasably attached to said slide member, and an adjustable outrigger is releasably attached to said outrigger support, wherein said adjustable outrigger having a generally concavo-convex shape, said engine mounting stand is adapted to secure the engine to facilitate maintenance and repair, and is further adapted to rotate the engine to allow a mechanic access to selected areas of the engine.

7. The engine mounting stand as recited in claim 6, wherein said vertical upright is mounted to a base.

8. The engine mounting stand as recited in claim 6, wherein said adjustable outrigger includes an end aperture that is attached to the engine by means of a threaded bolt.

9. An engine mounting stand comprising: a vertical upright comprising a fixture, a mounting assembly releasably secured to said fixture, said mounting assembly including a pair of brackets adapted for coupling to a small engine, wherein said mounting assembly further includes a slide member having a pair of elongated, longitudinally extending slots, wherein said brackets are secured to said extending slots such that said brackets are longitudinally repositionable long the length of said slots, wherein an adjustable outrigger support is releasably attached to said slide member, and an adjustable outrigger is releasably attached to said outrigger support, said engine mounting stand is adapted to secure the engine to facilitate maintenance and repair of the engine.

10. The engine mounting stand as recited in claim 9, wherein said vertical upright is mounted to a base.

11. The engine mounting stand as recited in claim 9, wherein the fixture is a rotatable bearing, such that said engine mounting stand is adapted to rotate the engine to allow a mechanic access to selected areas of the engine.

12. The engine mounting stand as recited in claim 9, wherein said adjustable outrigger includes an end aperture that is attached to the engine by means of a threaded bolt.

* * * * *